April 24, 1928.
F. W. HECHLER
HANDLE FOR COFFEEPOTS OR THE LIKE
Filed Oct. 15, 1927
1,667,519
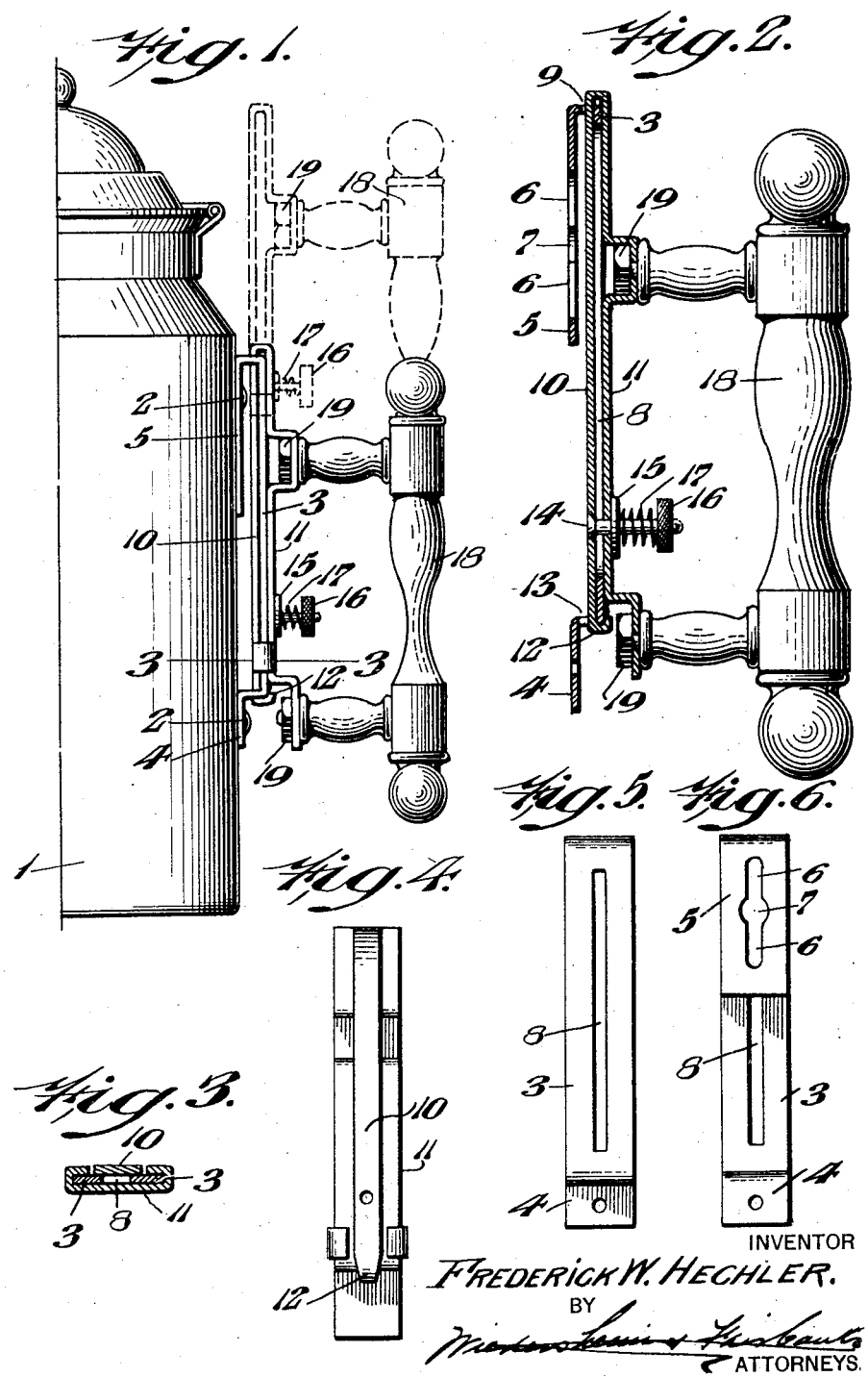
INVENTOR
FREDERICK W. HECHLER.
BY
ATTORNEYS.

Patented Apr. 24, 1928.

1,667,519

UNITED STATES PATENT OFFICE.

FREDERICK W. HECHLER, OF DARBY, PENNSYLVANIA.

HANDLE FOR COFFEEPOTS OR THE LIKE.

Application filed October 15, 1927. Serial No. 226,304.

This invention relates to a culinary vessel such as a coffee pot, a tea pot, chocolate pot, or the like, and has more especial relation to a handle therefor which may be perpendicularly elevated out of the range of heat and flames of a fire and held in raised position under spring tension.

The leading object of the present invention may be said to reside in the provision of a handle of the character stated the sliding parts of which may be stamped from sheet metal or the like to provide very simple, efficient, and comparatively inexpensive parts.

A further object of the present invention is to provide an arrangement, combination, and connection of parts for attaining the results sought by the foregoing object.

A still further object of the present invention is to provide a handle of the character stated which while slidable in a vertical manner with respect to the utensil cannot be detached therefrom either at the lower end or bodily removed therefrom, but remains a part of the utensil.

Other and further objects not at this time appearing will be hereinafter more fully described.

The invention consists of the novel construction hereinafter described and finally claimed.

The nature, characteristic features and scope of the invention will be more fully understood from the following description taken in connection with the accompanying drawings forming part hereof, and in which:

Fig. 1, is a view in side elevation illustrating the application of a handle embodying the invention to a culinary vessel the handle parts being shown in full lines in normal position, and in dotted lines to show the vertical elevated position of the handle.

Fig. 2, is a view of a handle detached from the vessel and is shown partly in elevation and partly in vertical section.

Fig. 3, is a view in cross section taken upon the line 3—3 of Fig. 1.

Fig. 4, is an end view of the plate which is attached to the handle proper and which has slidable relation with the plate shown in Figs. 5 and 6.

Fig. 5, is a face view of a plate with which the plate shown in Fig. 4 has slidable engagement.

Fig. 6, is a view of the opposite face of Fig. 5.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, the reference numeral 1 designates a culinary vessel which may be a coffee pot, chocolate pot, tea pot or the like, and but one half of which is shown in the drawings since the same may be of any conventional type. Fixed to the vessel 1 as by rivets or the like 2 is the plate shown in Figs. 5 and 6. Each end of the plate which is designated by reference numeral 3 is provided with an angular extension the upper extension 5 being arranged in alignment with extension 4, but being of greater dimensions. The lower extension 4 is apertured for rivet reception and the extension 5 is provided with an elongated slot 6 the intermediate ends of which are provided with a circular opening 7. In practice the lower extension 4 is riveted directly to the vessel 1. However, in some cases it may be convenient because of different sized vessels to first insert the head of the upper rivet 2 through the aperture 7 and then slide the plate 3 along the rivet in order to properly position plate 3. This plate 3 is also slotted at 8 for a purpose to presently appear. Located in the extreme top of the plate 3 is a slot 9, adapted for vertical travel through which is the prong 10 of plate 11, see Fig. 4. This prong 10 at its lower end is provided with an outwardly turned lip 12, the normal position of which is that shown in Figs. 1 and 2 in which said lip passes through the slotted part 13 of the lower end of plate 11, the said lip engaging the outer surface of said plate 11, as clearly shown in Fig. 2. The normal position of the plates 3 and 11 is thus that shown in Fig. 2, and the prong 10 has fixed thereto a pin 14 which passes through the plate 11 in a horizontal manner and is provided with a washer 15 which abuts against the outer face of plate 11 and is also provided with a pull knob 16 there being a coiled spring 17 between said washer and knob. Thus, to release the handle 18 for vertical movement, the operator first pushes down the handle 18 to release the lip 12 from engagement with plate 11 and thereupon pushes inwardly knob 16 against the pressure of spring 17 whereupon the handle 18 may be slid vertically to the position shown in dotted lines in Fig. 1. This release of the lip 12 may be accomplished for the reason that between the top of plate 11 and the underside of plate 3 there is a slight space, as clearly shown in Fig. 2. This slight space permits sufficient movement of the lip 12 in a downward direction to release it from engagement with plate 11. The handle 18 is secured to the plate 11 by means of screws or the like, bolts 19 being shown for illustrative purposes. The bolts 19 are contained in angular depressions in the plate 11 in order to afford free and unobstructed vertical movement of the sliding parts. The slotted part 8 of the plate 3 enables the pin 14 to readily move up and down through the plate 3.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. A cooking utensil having a vertical guide plate fixed thereto, a handle carrying member having a down-turned, hook-like end slidable vertically of said plate, means operative to lock said member with respect to said plate, and a handle detachably fixed at each end to said member which member has detachable relation with respect to said utensil.

2. A cooking utensil having a vertical guide plate fixed thereto, a handle carrying member having a down-turned, hook-like end slidable vertically of said plate, means including a spring pressed catch operative to lock said member with respect to said plate, and a handle detachably fixed at each end to said member, which member has detachable relation with respect to said utensil.

3. A cooking utensil having a vertical guide plate fixed thereto, a handle carrying member having a down-turned, hook-like end slidable vertically of said plate, means, including a spring extension upon said slidable member and a spring pressed catch, operative to lock said member with respect to said plate, and a handle detachably fixed at each end to said member, which member has detachable relation with respect to said utensil.

4. A cooking utensil having a vertical guide plate fixed thereto, a handle carrying member having a down-turned, hook-like end slidable vertically of said plate, means operative to lock said member with respect to said plate, a handle detachably fixed at each end to said member, which member has detachable relation with respect to said utensil, and means including a slot and guide connection between said member and plate for maintaining said parts in vertical, sliding engagement.

FREDERICK W. HECHLER.